(12) United States Patent
Hayashi

(10) Patent No.: US 7,128,095 B2
(45) Date of Patent: Oct. 31, 2006

(54) VIBRATION DAMPING COUPLING

(75) Inventor: Kaneyoshi Hayashi, Kawaguchi (JP)

(73) Assignee: Sankei Giken Co., Ltd., Saitama (JP)

( * ) Notice: Subject to any disclaimer, the term of this patent is extended or adjusted under 35 U.S.C. 154(b) by 0 days.

(21) Appl. No.: 10/778,331

(22) Filed: Feb. 17, 2004

(65) Prior Publication Data

US 2004/0226622 A1   Nov. 18, 2004

(30) Foreign Application Priority Data

Feb. 17, 2003   (JP) .............................. 2003-038942

(51) Int. Cl.
F16L 11/00   (2006.01)

(52) U.S. Cl. ................. 138/30; 138/121; 138/126; 138/127; 138/137

(58) Field of Classification Search ............. 138/121, 138/122, 30, 119, 138
See application file for complete search history.

(56) References Cited

U.S. PATENT DOCUMENTS

| | | | | |
|---|---|---|---|---|
| 3,305,251 A | * | 2/1967 | Skinner | 285/229 |
| 3,420,553 A | * | 1/1969 | Poxon et al. | 285/49 |
| 3,473,565 A | * | 10/1969 | Blendermann | 137/593 |
| 3,550,639 A | * | 12/1970 | Okuda | 138/121 |
| 4,086,665 A | * | 5/1978 | Poirier | 623/1.44 |
| 4,147,185 A | * | 4/1979 | Hines | 138/121 |
| 4,854,416 A | * | 8/1989 | Lalikos et al. | 181/207 |
| 4,867,269 A | * | 9/1989 | Lalikos et al. | 181/207 |
| 5,806,899 A | * | 9/1998 | Norikawa et al. | 285/299 |
| 6,015,065 A | * | 1/2000 | McAlister | 220/586 |
| 6,321,794 B1 | * | 11/2001 | Ishida et al. | 138/121 |
| 6,354,332 B1 | * | 3/2002 | Burkhardt et al. | 138/109 |
| 6,375,273 B1 | * | 4/2002 | Pont | 301/59 |
| 6,398,837 B1 | * | 6/2002 | Alvin et al. | 55/486 |
| 6,412,520 B1 | * | 7/2002 | Yasumatsu et al. | 138/141 |
| 6,631,741 B1 | * | 10/2003 | Katayama et al. | 138/121 |

FOREIGN PATENT DOCUMENTS

| | | |
|---|---|---|
| JP | 7-310889 | 11/1995 |
| JP | 8-145270 | 6/1996 |
| JP | 8-285170 | 11/1996 |
| JP | 8-303679 | 11/1996 |
| JP | 10-252952 | 9/1998 |
| JP | 10-252963 | 9/1998 |
| JP | 10-252964 | 9/1998 |
| JP | 2001-090134 | 4/2001 |
| JP | 2001-159478 | 6/2001 |

* cited by examiner

*Primary Examiner*—James Hook
(74) *Attorney, Agent, or Firm*—Antonelli, Terry, Stout & Kraus, LLP

(57) ABSTRACT

A vibration damping bellows with a high vibration absorbing effect and whose a simple structure. In a vibration damping coupling, for example, the vibration damping bellows is formed by interposing viscoelastic material, material with low elasticity, or combination thereof between an inner member and an outer member, which are made of stainless steel. The stainless steel inner member and/or outer member may be omitted when occasion demands. The material of the stainless steel plate, for example, may be SUS 304 that is austenitic stainless steel. Further, flanges to perform connection with pipes may be provided in both ends of the bellows. The viscoelastic material may comprise elastomer such as silicone rubber and vibration damping alloy.

8 Claims, 12 Drawing Sheets

Comparative

Example

VIBRATION DAMPING COUPLING

CROSS-REFERENCE TO RELATED APPLICATION

This application is based upon and claims the benefit of priority from the prior Japanese Patent Application No. 2003-038942 filed on Feb. 17, 2003, the entire contents of which are incorporated herein by reference.

1. Field of the Present Invention

The present invention relates to an expansible-and-contractible vibration damping pipe, a coupling having the vibration damping pipe, a manufacturing apparatus of the vibration damping pipe, and a forming method of the vibration damping pipe and the like. More specifically, it relates to an expansible-and-contractible vibration damping pipe preventing vibration of a connected piping system and pulsation due to fluid flow in a connected pipe from propagating, a coupling having the vibration damping pipe, a manufacturing apparatus of the vibration damping pipe, and a forming method of the vibration damping pipe and the like.

2. Related Art

As a flexible expansible pipe with an improved vibration absorbing property, there is proposed also a flexible expansible pipe in which an outer periphery of a bellows-like metal pipe is wrapped with a heat resisting rubber layer (for example, JP-A-2001-159478). However, the structure of the pipe is extremely complicated such that productivity thereof is low.

Further, for example, there is proposed a vibration absorbing bellows pipe coupling having a bellows part comprising thin plate plural layers (for example, JP-A-2001-159478 and JP-A-10-252963). However, since a structure thereof is too complicated and, at the same time, plural layers of the thin plates of the same kind are overlapped therein, vibration damping ability may not be sufficient.

Further, there is proposed a pipe in which a vibration damping layer comprising a vibration damping material is provided between an inner pipe and an outer pipe (for example, JP-A-10-252952). However, since there is no flexibility, it is insufficient as a coupling.

Additionally, FIG. 10 shows configuration of an example of another conventional vibration damping coupling (for example, JP-A-8-303679). This vibration damping coupling 500 is composed of a bellows 501 interposed between pipes 601, and a movable orifice 502 is provided in one side of the bellows 501. Flanges 503, 602 with L-shaped cross-sections are protruded between an end part of the bellows 501 and an end part of the pipe 601, and the flange end parts are mutually butted with a predetermined spacing such that a housing 504 is formed. In the movable orifice 502, an orifice 505 is formed in a center of a disc-like plate, and an annular part 506 is formed on an outer periphery of the plate in an annulus ring. The annular part 506 is disposed inside the housing 504.

Annular vibration absorbing rubbers 507, 508 are disposed inside the annular part 506 and outside a bellows end part 501a and a pipe end part 601a. Concretely, outer faces of both vibration absorbing rubbers 507, 508 closely are attached to an inner face of the annular part 506 of the movable orifice 502, an inner face of the vibration absorbing rubber 507 in turn are closely attached to an outer peripheral face of the bellows end part 501a. An inner face of the other vibration absorbing rubber 508 is closely attached to an outer peripheral face of the pipe end part 601a. Further, the flanges 503, 602 are mutually butted with certain spacing such that the pipe 601 and the bellows 501 are brought in a state of being connected with the movable orifice 502 which is mounted on the vibration absorbing rubbers 507, 508.

Here, when the above vibration damping coupling is used in facilities of buildings such as a hotel and an apartment such that vibration generating devices such as a compressor and a pump is attached to the piping 601, the vibration may be propagated through the piping 601, but this vibration is absorbed and damped by the vibration absorbing rubbers 507, 508 of the movable orifice 502. Further, if the pulsation is caused in fluid flowing inside, the vibration of the movable orifice 502 due to the pulsation may also be absorbed by the vibration absorbing rubbers 507, 508.

However, in the above conventional vibration damping coupling 500, a vibration damping structure is formed around the movable orifice 502 and thus the structure becomes complicated, so that it is not necessarily desirable.

SUMMARY OF THE PRESENT INVENTION

The present invention was made in view of the foregoing, and an object is to provide a vibration damping bellows having a rather simple structure and high vibration damping effects. Also, An object is to provide a manufacturing apparatus of the vibration damping bellows, and a forming method of the vibration damping bellows.

In order to achieve the above objects, there is provided a pipe having a shape expansible-and-contractible in an axial direction, wherein a viscoeleastic member is disposed between an inner member and an outer member which are disposed in the inner part and the outer part of the pipe, respectively, so as to constitute the pipe.

If the vibration in an axial direction and/or a direction perpendicular to the axial direction is transmitted from pipes etc. connected to the vibration damping pipe, this vibration is not only relaxed by the expansible-and-contractible pipe, but also the vibration is at least partially absorbed by the viscoelastic member provided between inside of the inner member and outside of the outer member. In a similar manner, the pulsation by the fluid flowing inside the pipe may be absorbed by the viscoelastic member at least partially. The way of fixing the vibration damping pipe to the pipe, any publicly known technologies such as connection with flanges may apply.

Concretely, the following is provided.

(1) A vibration damping pipe having a shape expansible-and-contractible in an axial direction, comprising: an inner member disposed on inside thereof and an outer member disposed on outside so as to cover over the inner member; wherein a viscoelastic member is disposed between the inner member and the outer member.

Here, the pipe may be one separating an exterior from an interior and being capable of passing fluid etc. through an inside thereof, and the pipe may extend along a certain axis. For example, a tubular shape may apply. However, a cross-section thereof is not necessarily to be circular and may be rectangular. The certain axis is not necessarily to extend straight and may be curved. The expansible-and-contractible shape may include, for example, a bellows shape, a concertina shape, and the like. Further, it may include a shape expansible or contractible in the axial direction without deforming a basic pipe shape. For example, it may include a wrinkled shape and/or a shape capable of being wrinkled. Additionally, it may be a shape allowing the deformation in a direction other than the axial direction. In other words, it may be a pipe which has the shape expansible-and-contractible in the axial direction and is bendable in at least one direction. That is, when the pipe is bent, a compressive stress is applied to a pipe wall in the bending side and a tensile stress is applied to the opposite side. The pipe may include a portion having a double structure comprising the inner member and the outer member as mentioned above. Although not limited to in particular, the inner member and/or outer member may be composed of metal, and may be organic material such as engineering plastic or inorganic material such as ceramics. It is, however, preferable that the pipe is composed of metal material. More preferably, it may be constituted from a stainless. The viscoelastic member may be constituted of material such as elastomer and, more preferably, may be constituted of silicone rubber.

(2) A vibration damping pipe comprising: an inner member of bellow shape; an outer member of a shape covering over the inner member; and a vibration damping layer being composed of material having lower elasticity than material of the outer member or structure, the vibration damping layer being disposed between the inner member and the outer member.

For example, if the inner member and the outer member are composed of stainless steel, the material with lower elasticity modulus may include softer metal material, organic material such as resin and plastic, and the like. More preferably, the material may comprise elastomer and, more preferably, silicone rubber.

(3) The vibration damping pipe according to (1) or (2), wherein the viscoelastic member or the material having lower elasticity comprises elastomer, vibration damping alloy, or combination thereof.

By using a rubber as a vibration absorbing layer, the vibration transmitted to the inner member and the outer member can be effectively absorbed. The elastomer may comprise natural rubber, butadiene rubber, chloroprene rubber, butyl rubber, chlorosulfonated polyethylene, epichlorohydrin rubber, nitrile butadiene rubber, acrylic rubber, polysulfide rubber, nitrile isoprene rubber, silicone rubber, polyvinyl chloride elastomer, chlorinated polyethylene, ethylene-vinyl acetate copolymer elastomer, ethylene-propylene copolymer elastomer, styrene butadiene elastomer, urethane rubber, fluororubber, or a combination thereof.

The vibration damping alloy may comprise spheroidal graphite cast iron, SILENTALLEY, magnesium alloy, SONOSTONE, manganese-copper alloy, M2052, or a combination thereof.

(4) A vibration damping coupling comprising the vibration damping pipe of any one of the above (1) to (3).

Here, the vibration damping coupling may include a member, such as a ring and a flange, to be connected to a mating member as the coupling. Such a coupling can be manufactured by an apparatus and a method described as follows.

For example, it is an apparatus for manufacturing a vibration damping coupling having 1st and 2nd flanges in its both ends. The apparatus comprises: a base plate facing an outside face of the 1st flange of the vibration damping coupling; an inner press die into which a tubular member to be formed in a bellows shape of the vibration damping coupling with hydraulic pressure and to be provided approximately in perpendicular to the outside face of the 1st flange of the vibration damping coupling is inserted; a movable plate facing an outside face of the 2nd flange; and a plurality of outer press dies provided between the 1st and 2nd flanges and moved by predetermined amounts respectively in accordance with a moving amount of the 2nd flange when the 2nd flange is pressed by the movable plate.

Further, for example, it is a method of manufacturing a vibration damping coupling from a tubular body having 1st and 2nd flanges in its both ends. The method comprises the steps of: butting the 1st flange against a face of a base plate; inserting an inner press die capable of being bulged with hydraulic pressure into the tubular body before being formed into a bellows shape of the vibration damping coupling; disposing a plurality of outer press dies around the tubular body; butting a movable plate against the 2nd flange; and moving the movable plate to the base plate side at the same time as the inner press die is bulged with the hydraulic pressure wherein, at this time, a bulging amount of the inner press die and a moving amount of the movable plate are controlled while being mutually correlated.

Additionally, there may be more preferably applied also a method of manufacturing a vibration damping coupling, wherein, in the above method of manufacturing the vibration damping coupling, the tubular body comprises an inner member disposed inside and an outer member disposed outside so as to extend along the inner member, and a viscoelastic member is disposed between the inner member and the outer member.

With this constitution, the bulging formation is performed under a state that a vibration absorbing layer is provided between the inner member and the outer member. That is, with expansion of the inner member and the outer member, this vibration absorbing layer is also expanded so that it is possible to form the tubular member integrally.

Further features of the present invention, its nature, and various advantages will be more apparent from the accompanying drawings and the following detailed description of the present invention.

DETAILED DESCRIPTION OF THE PRESENT INVENTION

Hereunder, the present invention is explained in detail in reference to the drawings. The present invention, however, is not limited to the embodiments. Further, constituting elements of the embodiments may include one that can easily be replaced by a person skilled in the art, and substantially the same one.

Figure 1:
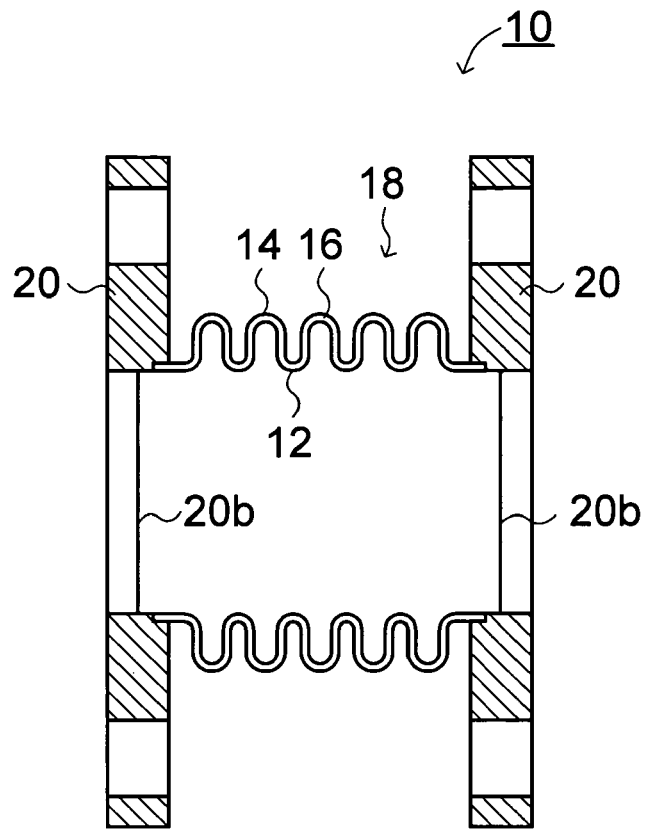
FIGS. 1A and 1B are cross sectional views showing a vibration damping coupling according to an embodiment of the present invention.
Figure 1:
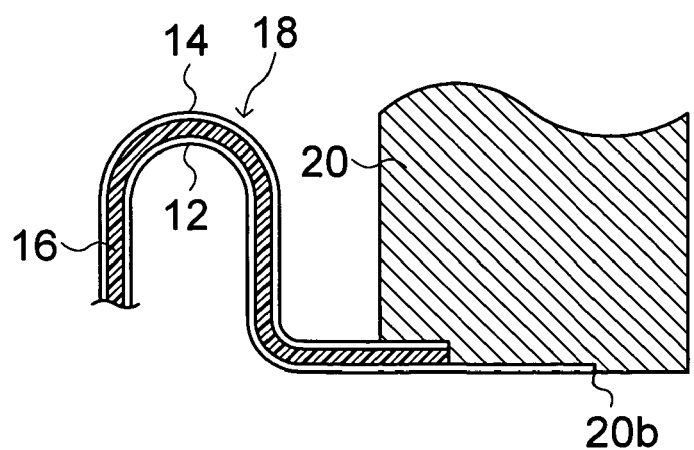

FIG. 1A is a sectional view showing a vibration damping coupling according to the embodiment of the present invention. As shown in FIG. 1A, this vibration damping coupling 10 has a structure that a vibration absorbing rubber 16 as a vibration absorbing layer is interposed between an inner member 12 and an outer member 14 which are made of stainless steel, thereby forming a vibration damping bellows 18. FIG. 1B shows a partially enlarged view thereof. As material of the stainless steel plate, SUS 304 as a typical austenitic stainless steel and SUS 316 containing a low carbon concentration but a high Ni concentration so as to enhance corrosion resistance. Further, at both ends of the bellows 18, flanges 20, 20 facilitating connection with a pipe (not shown) are provided in a fixed state by welding at welding zones 20b, 20b. The vibration absorbing rubber 16 is composed of silicone rubber, polyisoprene, polybutadiene, polychloroprene, fluorocarbon rubber, and the like. Further, although not shown in the drawing, the above vibration absorbing layer is not limited to the rubber as long as it has excellent formability. For example, it may be a composite material being composed of synthetic resin, non-woven fabric such as felt, and the like.

As the synthetic resin, polyethylene (PE), polypropylene (PP), polystyrene (PS), polyvinyl chloride (PVC), and the like may be enumerated. Especially, if porous material formed in a sponge state with polystyrene made porous by using carbon dioxide as a foaming agent is utilized, absorbability of the vibration by the porous material may be enhanced depending on the kind of the vibration to be damped. Further, the vibration absorbing layer is not necessarily composed of one lump of material as a whole, but it may be composed of an aggregation of flaked pieces, granular pieces, or powdered pieces. The material for the vibration absorbing layer may comprise almost all kinds of material such as rubber, metal, resin and ceramics. When the aggregation of material is not sufficiently compact, it is more preferable to confine the aggregation between the inner member 12 and the outer member 14. However, the way to seal the material is excellent in the vibration absorbability in dependence on the kind of vibration to be absorbed, and the selectable range of material is very broad. For example, if material of relatively high heat resistance such as fluorocarbon rubber is used, it can be suitably used under a high temperature environment. Further, in consideration of prevention of galvanic corrosion and the like, it is more preferable that the inner member 12 and the outer member 14 are composed of metals having similar electric potentials, or the same metal.

In this embodiment, the inner member 12 and the outer member 14 are made of the austenitic stainless steel, but are not limited to the material. For example, it may be a ferritic stainless steel (SUS 430 and the like). It is also possible to use Mg-aluminum alloy, Mn-aluminum alloy, and the like. Further, the vibration absorbing rubber 16 may be composed of two or more laminated layers.

Figure 2:
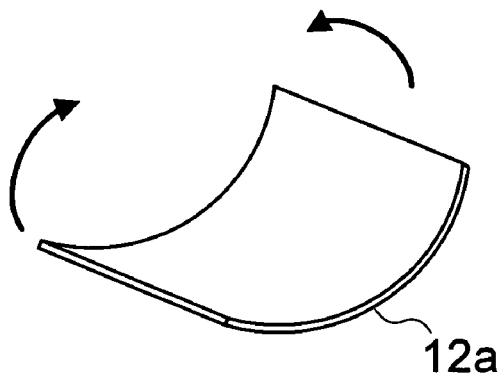
FIGS. 2A to 2F illustrate processes of forming a bellows.
Figure 2:
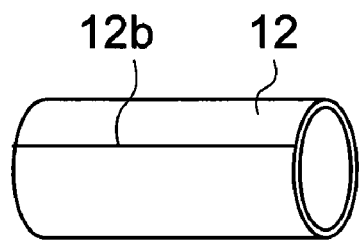
Figure 2:
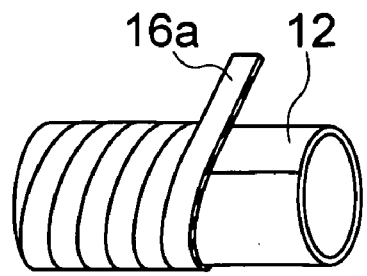
Figure 2:
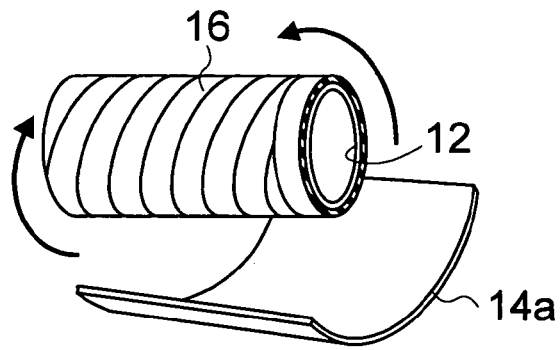
Figure 2:
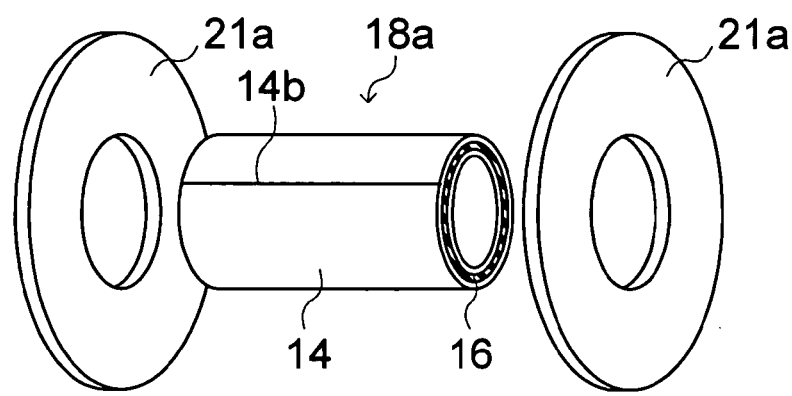
Figure 2:
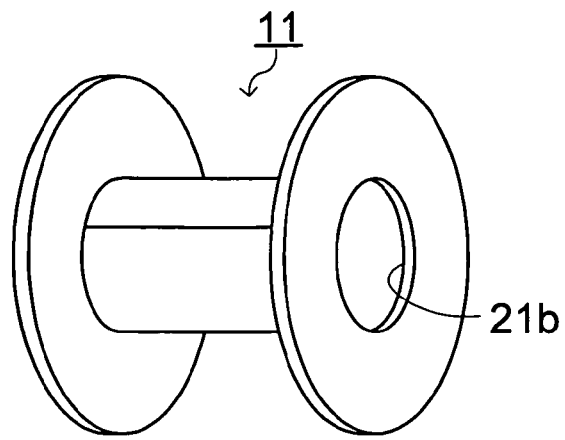

In order to form the bellows 18, as shown in FIG. 2A, first a stainless plate 12a of a predetermined thickness is rolled to form a cylinder-like shape such that end portions thereof are mutually welded. Then, such a cylindrical inner member 12 as shown in FIG. 2B is formed. in this process, welding of butting portions 12b may preferably be performed by laser welding since it is a thin plate and it is preferable to suppress HAZ. Besides, although radio-frequency welding, upset welding and the like may be used, it is preferable to have continuous welding so as to prevent leakage of fluid etc. flowing inside the pipe. Next, as shown in FIG. 2C, a band-like vibration absorbing rubber 16a is wound around the inner member 12, and fixed with adhesive or the like. And, as shown in FIG. 2D, a stainless plate 14a to become the outer member 14 is wound around the vibration absorbing rubber 16, and mutual butting portions thereof or overlapped portions thereof 14b are welded. In this occasion, it is preferable to prevent the inside vibration absorbing rubber 16 from being melted by adjusting a penetration depth of the laser and, from this viewpoint, the overlap welding is more preferable. In this manner, a tubular member 18a to be formed into the bellows 18 is formed.

This tubular member 18a is welded to discs 21a, 21a, which are utilized as flanges and depicted in both sides of the tubular member 18a. Each of the discs has an opening part First, end parts of the tubular member 18a are fitted to the respective opening parts of the discs 21a, 21a, as shown in FIG. 2F, and welded at respective inner peripheral parts 21b. In this manner, a flanged cylinder 11 (FIG. 2F) is formed as a preliminary assembly of the vibration damping coupling.

The flanged cylinder 11 prepared as mentioned above is formed into a bellows shape (or concertina shape) by a forming apparatus utilizing the hydraulic pressure. In this forming apparatus, a columnar inner press die to form the tubular part into a bellows shape with the pressure is inserted by pressing it approximately in a perpendicular direction to a base plate, and a movable plate capable of moving along an axial direction of the inner press die is disposed so as to oppose to the base plate. A plurality of outer press dies are provided between the base plate and the movable plate with an approximately equal interval. The plurality of outer press dies are disposed outside the cylinder 11 so that the cylinder is formed into a bellows shape by receiving portions of the tubular part bulged by the inner press die, thereby performing a bellows shape formation of the tubular part. The movable plate is provided with an opening part into which the inner die is inserted. Each of the separated outer press dies is moved in an axial direction at a predetermined ratio with a movement of the movable plate. Further, in order to remove the formed article, each of the outer press dies can be divided into semi-annulus ring parts. A movable structure may be adapted, for example, such that the movable plate and each outer press die are mechanically connected in a rack-and-pinion mechanism and each moving amount of each outer press die may be determined by adjusting a gear ratio of the rack-and-pinion mechanism, or the individual outer press die is moved under the actuator control. Further, a vicinity of each pressing end of the outer press dies is formed into a curved face to be fitted to a curved part of the bellows 18.

The cylinder 11 is slid such that the inner press die is inserted into a tubular hollow part of the flanged cylinder 11, and one of the flanges of the cylinder 11 is butted against the base plate. The flanged cylinder 11 is set to the forming apparatus such that the inner press die is inserted into each outer press die and the movable plate. Under this state, one end of the flanged cylinder 11 butts against a face of the base plate, the other end butts against a face of the movable plate, and the flanged cylinder 11 is restrained between the base plate and the movable plate. And, the hydraulic pressure is applied to the inner press die to bulge the tubular part and the movable plate is moved by applied pressure to the movable plate. Further, as the movable plate is moved, the outer press dies are also respectively moved in the axial direction by respective predetermined amounts. Further, as the outer press dies are moved, the outer press dies press an outer side face of the flanged cylinder 11.

As a result, since the flanged cylinder 11 is under a state of being inserted into the inner press die, it expands by being bulged in its axial and radial directions with the pressure application by means of the movable plate. And, the bulged portions of the flanged cylinder 11 are formed into a mountain-and-valley shape by being pressed against outside curved faces of the outer press dies. After the formation, the outer press dies are removed from the formed article by dividing itself, the movable plate is removed from the inner press die, and the formed bellows 18 is removed from the inner press die. In this manner, if the flanged cylinder 11 is formed by expansion as it is compressed in the axial direction, it is possible to form the bellows 18 without excessively changing thicknesses of the inner member 12, the outer member 14 and the vibration absorbing rubber 16.

Further, it is also possible to form the bellows 18 by any methods other than the above. For example, in the flanged cylinder 11, materials such as isoprene and butadiene are put between the inner member 12 and the outer member 14 together with sulfur and the flanged cylinder 11 is formed into the bellows 18 with the above-mentioned method, then the materials may be vulcanized by heating. In this way, a crosslinking reaction occurs in the polymer materials inside so that the vibration absorbing rubber 16 having rather high modulus of elasticity may be made. Further, an aggregation of powdered materials may be put between the inner member 12 and the outer member 14 and the flanged cylinder 11 may be formed in a similar manner as mentioned above.

When the vibration damping coupling 10 formed in a manner mentioned above is used in the building facilities such as hotel and apartment, devices causing the vibration such as a compressor and a pump are fixed to the pipe (not shown) so that the vibration may be transmitted through the pipe, but the vibration is absorbed and damped by the vibration absorbing rubber 16. Further, the pulsation caused by fluid flowing inside the pipe may propagate to make the vibration of the bellows 18, but such vibration may be absorbed similarly by the vibration absorbing rubber 16.

Figure 3:
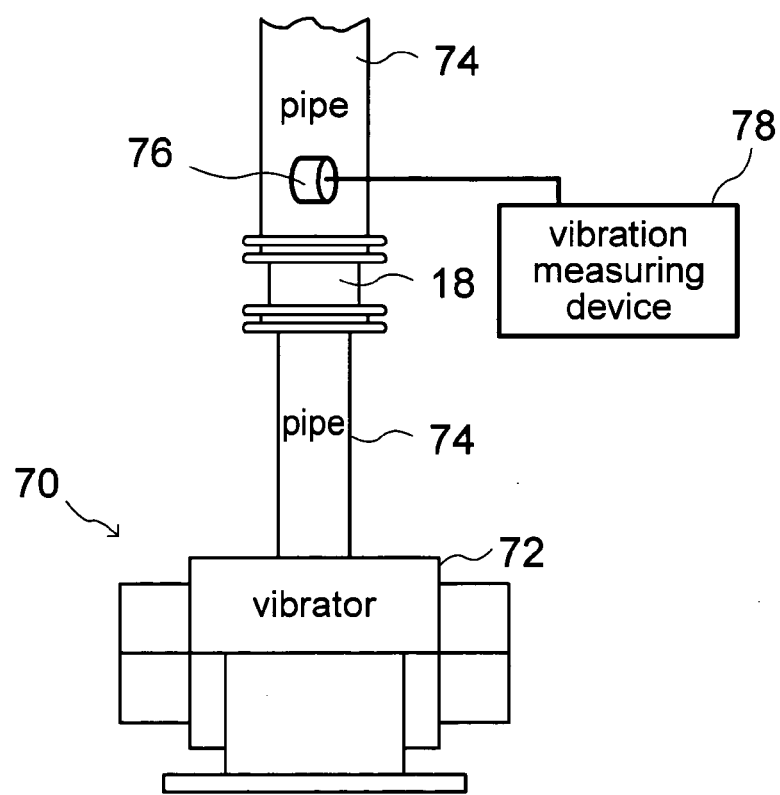
FIG. 3 is a schematic diagram showing an example of a testing apparatus.

Next, vibration absorbing characteristics of the bellows 18 were measured in the following experiments. In FIG. 3, a schematic diagram of a testing apparatus is shown. In the testing apparatus 70, a pipe 74 is installed on a vibrator 72 generating the vibration of a predetermined frequency, and the bellows 18 is installed midway of the pipes 74. As to diameters of the bellows 18, the inner diameter is about 65 mm, and the outer diameter is about 95 mm. Both the inner member 12 and the outer member 14 are made of SUS 304. The vibration absorbing rubber 16 comprising silicone rubber is interposed between the inner member 12 and the outer member 14. Plate thickness of the inner member 12 or the outer member 14 is about 0.3 mm, thickness of the vibration absorbing rubber 16 is about 0.5 mm, an outside bending radius of the bellows 18 is about 4.5 mm in average, and an inside bending radius is about 2.8 mm in average. The number of mountains in the bellows 18 is five. A testing frequency was made in a range of 1 Hz–500 Hz. Further, an acceleration pickup 76 is attached to the pipe 74 extending from the bellows 18, and an electric signal of the pickup was measured by a vibration measuring device 78.

Figure 4:
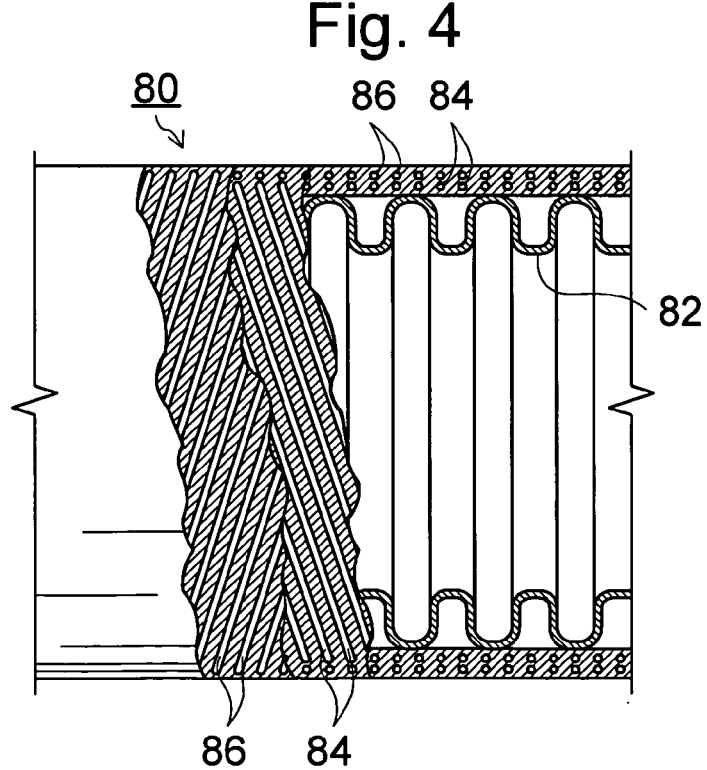
FIG. 4 is a schematic diagram showing a vibration damping coupling of a test piece that is a comparative example.

As a test piece for comparison, a vibration damping coupling 80 of reticulate braid system was measured. FIG. 4 shows the vibration damping coupling for a comparative sample. This vibration damping coupling 80 comprises a metal wire reticulate being made by winding metal wire groups 84, 86 around a bellows 82 and winding again the metal wire groups 84, 86 in the reverse direction.

Figure 5:
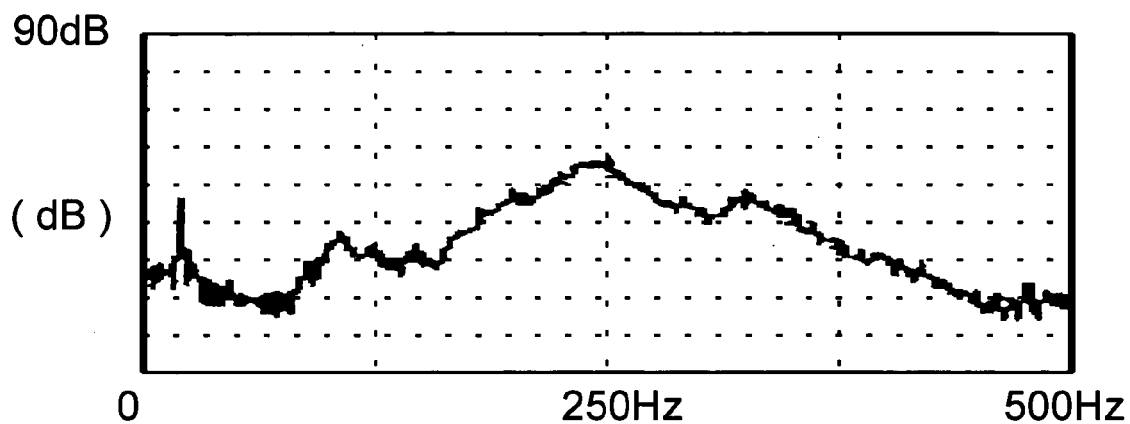
FIGS. 5A and 5B are graphs showing test results of a comparative example and an example.
Figure 5:
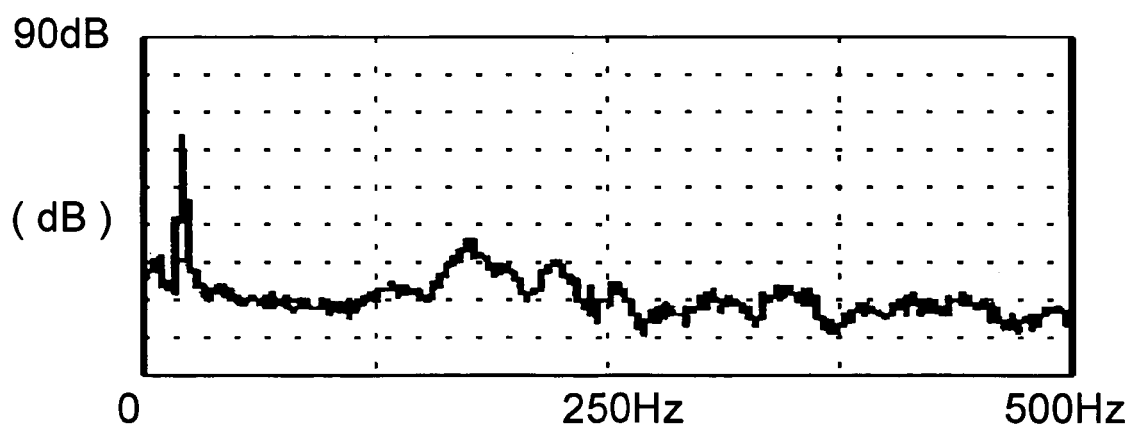

Results of the test are shown in FIG. 5A. The vibration damping coupling 80 that is the comparative example had the largest peak around 250 Hz, and a second largest peak around 350 Hz, and the highest peak was about 60 dB. In contrast to this, as shown in FIG. 5B, the bellows 18 according to an embodiment of the present invention had vibration absorbing effects in the above-mentioned range of frequency in average. Except around 20 Hz and around 150 Hz, in the whole range up to 500 Hz, it is as low as about 20 dB and, even near about 250 Hz, it is below 30 dB. Accordingly, in comparison with the comparative example, an especially remarkable effect is shown with respect to the vibration in the range of 200 to 400 Hz. This sound range is a rather low audible sound range and, from an environmental viewpoint, it is very preferable that this vibration can be controlled. For example, if a 1st pipe is connected to the pump and a 2nd pipe is connected to a device that should avoid such sound vibration and the 1st and 2nd pipes are connected via the vibration damping coupling of this embodiment, the vibration of the pump (or motor driving the pump) can be effectively shut down by this coupling.

Figure 6:
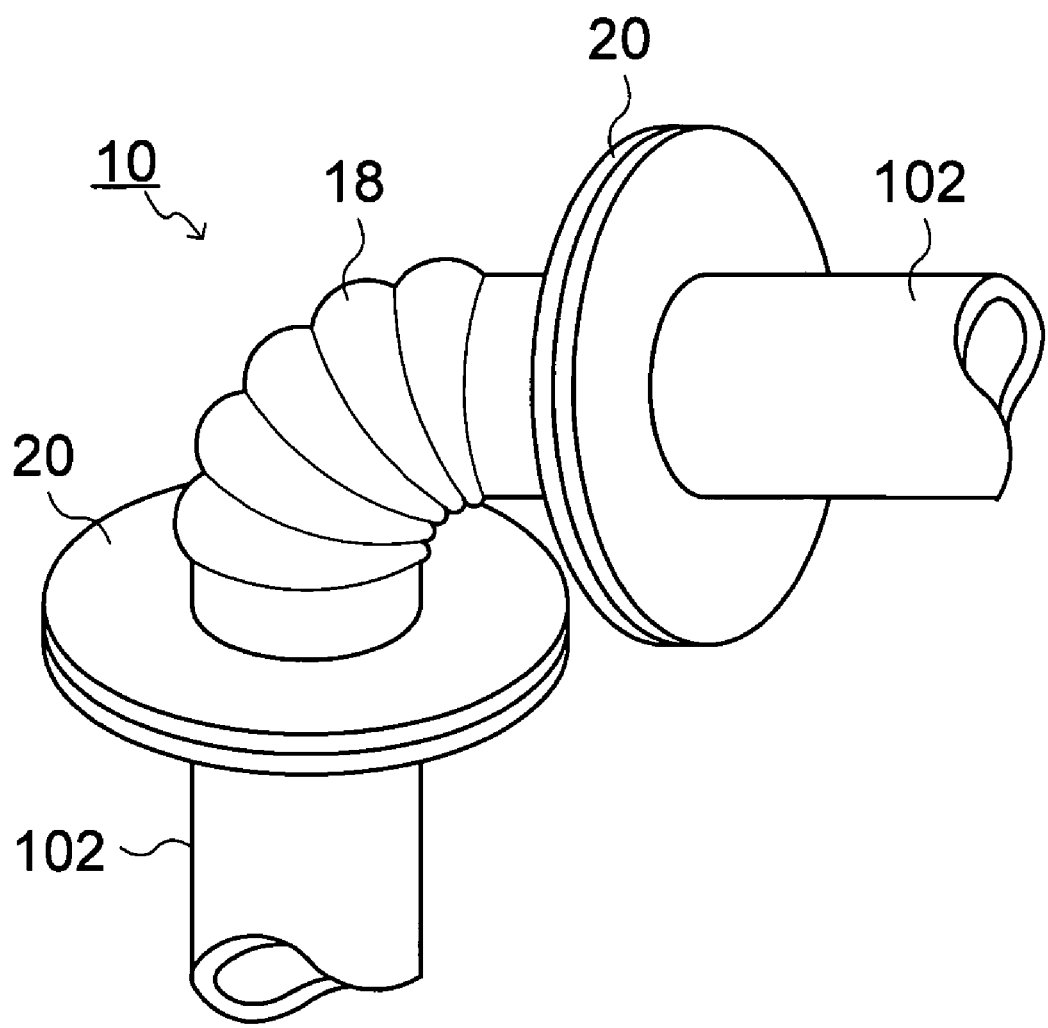
FIG. 6 is a perspective view showing a vibration damping coupling applied in another implementation mode.

FIG. 6 is a perspective view showing the vibration damping coupling 10 according to another embodiment in which the bellows 18 obtained here is used. Although this is used for connecting pipes 102, 102 intersecting approximately in perpendicular, the coupling can be used by being bent because the coupling has the bellows portion. More concretely, the pipes 102 and 102 are connected by fixing the flanges 20 by bolts (not shown), and the like. If the coupling is used under such conditions, a sufficient vibration damping function may be performed because of the effect of the vibration absorbing rubber.

Figure 7:
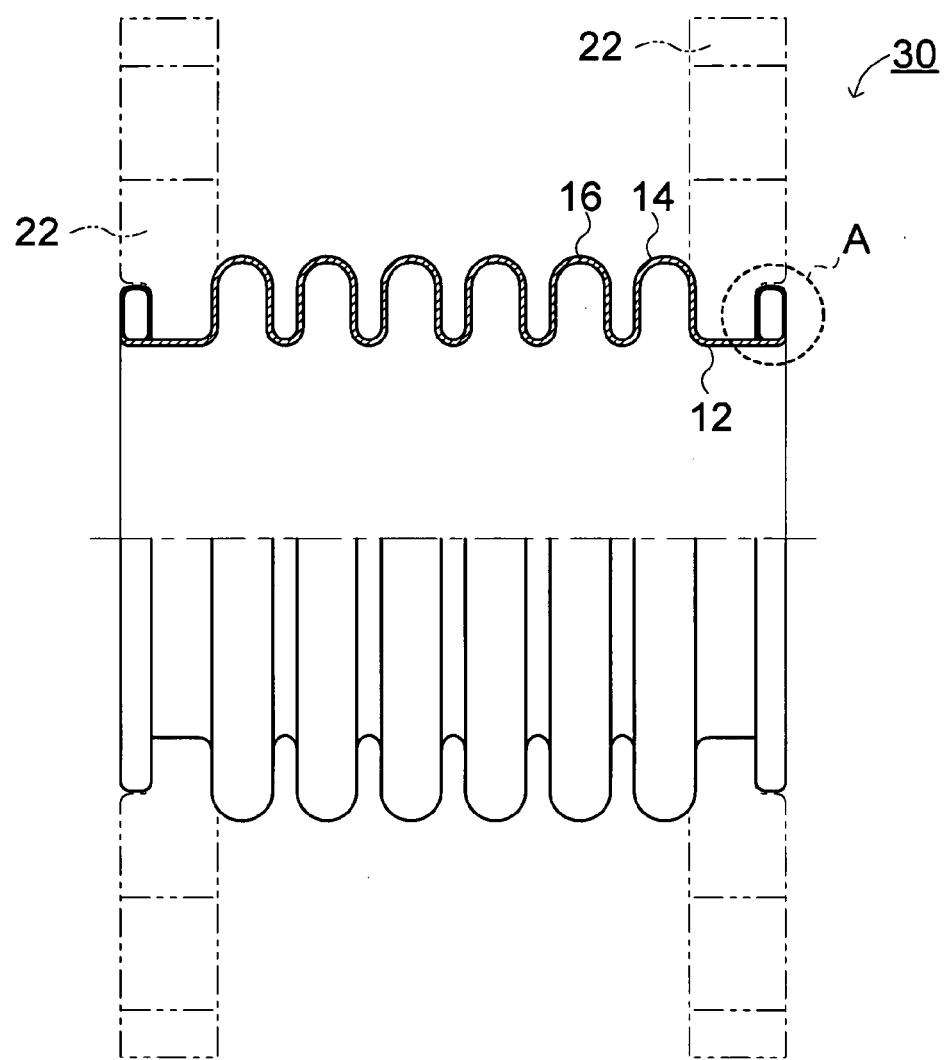
FIGS. 7A and 7B are cross sectional views showing a vibration damping coupling according to another embodiment.
Figure 7:
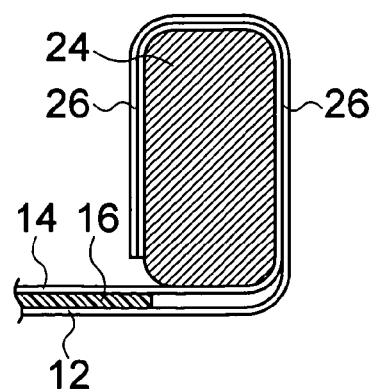

In FIGS. 7A and 7B, sectional views of a vibration damping coupling 30 according to another embodiment are shown. Except for rings 24 in both ends, the configuration thereof is similar to the vibration damping coupling 10 in FIG. 1A. The rings 24 at both ends are contained by a flare-like end part 26 composed of the inner member 12 and the outer member 14 of the bellows part of the vibration coupling 30 in a mutually laminated manner such that the rings 24 may be are fixed. The vibration damping coupling 30 having the rings 24 may be used as they are combined, for example, with flanges 22 depicted in chain double-dashed lines. Since the flange 22 and the end part including the ring 24 are set in a separable manner, positions of flange holes of the coupling may match easily with respective flange holes of the pipe to be connected to the coupling, so that work efficiency is improved.

Figure 8:
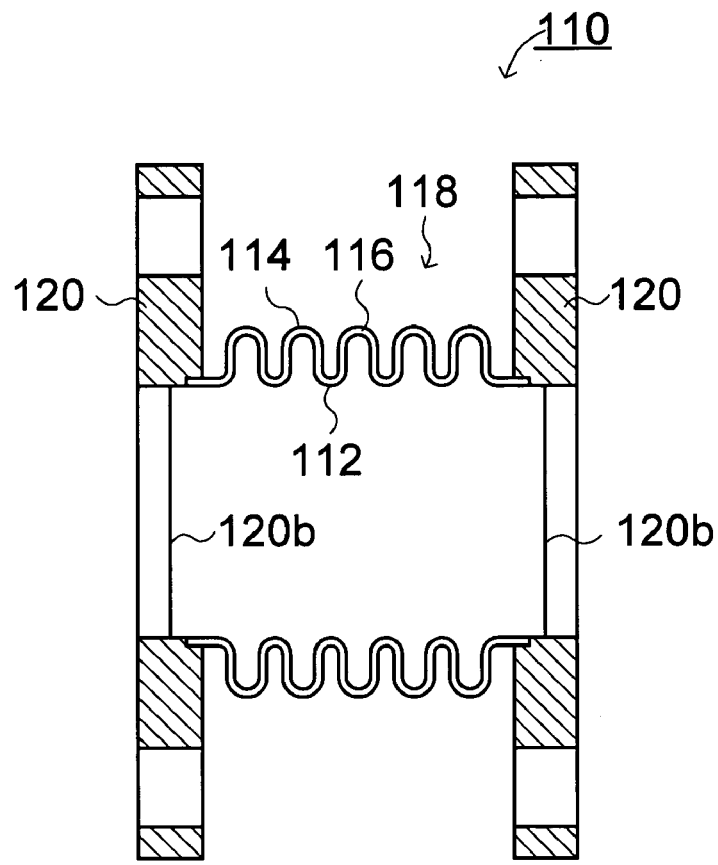
FIGS. 8A to 8C are cross sectional views showing a vibration damping coupling according to yet another embodiment.
Figure 8:
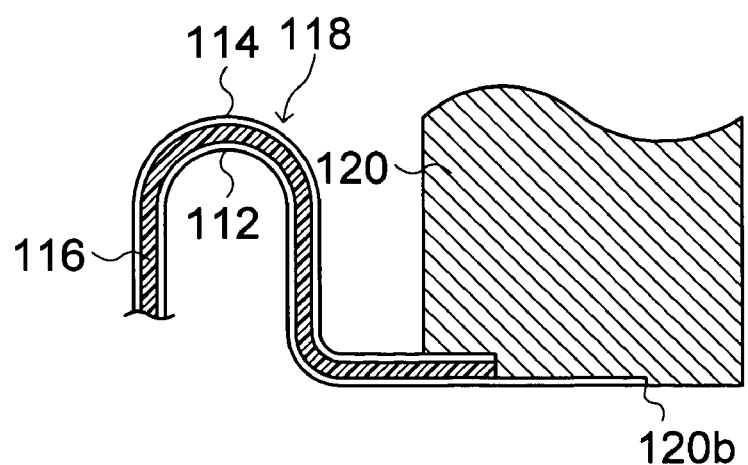
Figure 8:
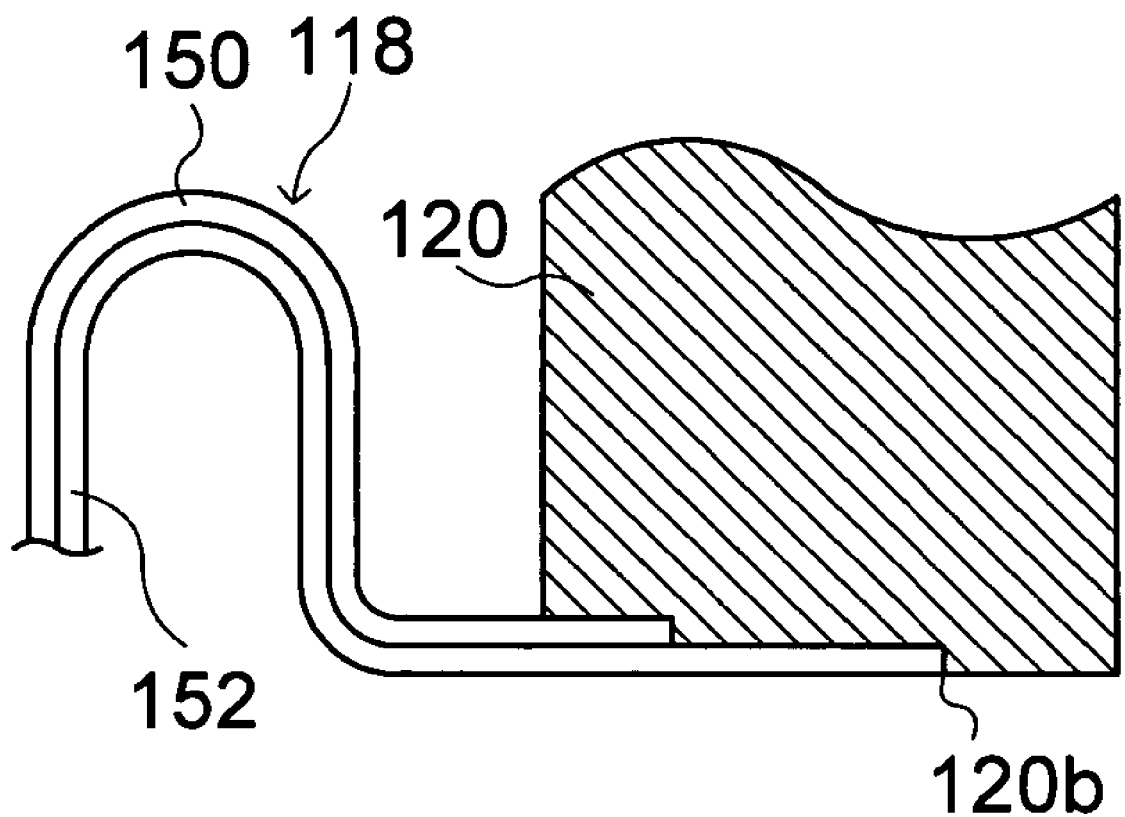

FIG. 8A shows a sectional view of a vibration damping coupling according to yet another embodiment of the present invention. As shown in FIG. 8A, this vibration damping coupling 110 has a structure that vibration damping alloy for a vibration damping layer 116 is interposed between an inner member 112 and an outer member 114 which are made of stainless steel, thereby forming a vibration damping bellows 118. FIG. 8B shows a partially enlarged view thereof. The material of the stainless plate, for example, may comprise SUS 304 of austenitic stainless steel and SUS 316 with a low carbon concentration and a high Ni concentration to enhance corrosion resistance. Further, flanges 120, 120 are respectively welded in welding zones 120b, 120b at both ends of the bellows 118 to perform connections with pipes (not shown).

The vibration damping alloy of the vibration damping layer 116, for example, may be alloy having vibration damping properties such as vibration damping alloy "M2052." This M2052 belongs to a "twin type" alloy of manganese base and includes 20% copper, 5% nickel and 2% iron. A twin is easily generated and moves in nature with the M2052. Main physical properties of the alloy are as follows: the specific gravity is 7.25, the coefficient of thermal expansion is $22.4 \times 10^{-6}/°$ C., and the thermal conductivity is 10 W/mK. Further, mechanical properties after annealing are as follows: the tensile strength is 500 MPa, the Young's modulus is 47 GPa, and the yield stress (0.2%) is 200 MPa. The vibration damping alloy "M2052" is Mn-base alloy comprising Mn 73, Cu 20, Ni 5, and Fe 2 (atomic %). Characteristics in applications are as follows: the workability is good in casting, forging, hot/cold rolling, welding, form rolling, machining, press working and the like, and the vibration damping performance is high. For example, the logarithmic decrement of 0.72 is obtained in a laboratory, and the logarithmic decrement of 0.2 to 0.3 is obtained even in the mass production. Further, it damps from low frequency to high frequency, and exhibits the performance even at liquid helium temperature of very low temperature. Additionally, it has characteristics that it is unlimitedly non-magnetic, its tensile strength is equivalent to mild steel, and it can be used in vacuum.

In addition to M2052 mentioned above, alloys absorbing the vibration by themselves may include four kinds of alloys: "composite type," "ferromagnetic type," "dislocation type," and "twin type." As examples of the "composite type" vibration damping alloys, there are spheroidal graphite cast iron, flake graphite cast iron (Fe—C—Si system), and Cosmal —Z (Al—Zn system). As examples of the "ferromagnetic type" vibration damping alloys, there are TD nickel, 13% chromium alloy, Fe -8 Al, SILENTALLEY (Fe -12Cr -3 Al), Trunkalloy (Fe -12 Cr -1.36 Al -0.59 Mn), Selena (Fe -2.4 Al -0.54Si), Wellcalm (Fe -3 Cr -2 Si -2 Al), Gentalloy (Fe -12 Cr -2 Al -3 Mo), NIVCO 10 (Co -22 Ni -2 Ti -1 Zr), and the like. As examples of the "dislocation type" vibration damping alloys, there are enumerated magnesium alloys such as K1×1alloy (Mg -0.6 Zr) and MCM (Mg -4 Cu -2 Mn), DAW steel, Fe -22 Mn -12 Cr, and the like. As examples of the "twin type" vibration damping alloys, there are enumerated manganese-copper type alloys like SONOSTONE (Mn -37 Cu -4.25 Al -3 Fe -1.5 Ni), Incramute I (Cu -40 Mn -2 Al -2 Sn), Incramute II (Cu -40 Mn -2 Al), Broteus (Cu -26 Zn -5 Al), Nitinol, and the like. Also these vibration damping alloys can be used similarly to the above M2052(one of the "twin type" vibration damping alloys), but it is considered that the M2052is more preferable from its performance and the like.

In addition to M 2052 mentioned above, alloys absorbing the vibration by themselves may include four kinds of alloys: "composite type," "ferromagnetic type," "dislocation type," and "twin type." As examples of the "composite type" vibration damping alloys, there are spheroidal graphite cast iron, flake graphite cast iron (Fe—C—Si system), and Cosmal —Z (Al—Zn system). As examples of the "ferromagnetic type" vibration damping alloys, there are TD nickel, 13% chromium alloy, Fe -8 Al, Silentalloy (Fe -12 Cr -3 Al), Trunkalloy (Fe -12 Cr -1.36 Al -0.59 Mn), Selena (Fe -2.4 Al -0.54 Si), Wellcalm (Fe -3 Cr -2 Si -2 Al), Gentalloy (Fe -12 Cr -2 Al -3 Mo), NIVCO 10 (Co -22 Ni -2 Ti -1Zr), and the like. As examples of the "dislocation type" vibration damping alloys, there are enumerated magnesium alloys such as K1×1 alloy (Mg -0.6 Zr) and MCM (Mg -4 Cu -2 Mn), DAW steel, Fe -22 Mn -12 Cr, and the like. As examples of the "twin type" vibration damping alloys, there are enumerated manganese-copper type alloys like Sonostone (Mn -37 Cu -4.25 Al -3 Fe -1.5 Ni), Incramute I (Cu -40 Mn -2 Al -2 Sn), Incramute II (Cu -40 Mn -2 Al), Broteus (Cu -26 Zn -5 Al), Nitinol, and the like. Also these vibration damping alloys can be used similarly to the above M 2052 (one of the "twin type" vibration damping alloys), but it is considered that the M 2052 is more preferable from its performance and the like.

It is preferable that a vibration damping layer 116 comprising such vibration damping alloys is disposed between an inner member 112 and an outer member 114 (FIG. 8B). Respective gaps between the vibration damping layer 116 and the inner member 112, and between the vibration damping layer 116 and the outer member 114 can be pressure-bonded by rolling or the like. However, pressure-bonding, joining, bonding or the like can be performed by any other known technologies. The vibration damping layer 116 may have improved corrosion resistance against environments outside a coupling 110 or inside the pipe by being interposed between the inner member 112 and the outer member 114 being made of stainless steel in this manner.

In this embodiment, the inner member 112 and the outer member 114 are made of austenitic stainless steel, but not limited to this. For example, it may be the ferritic stainless steel (SUS 430 and the like). It is also possible to use Mg-aluminum alloy, Mn-aluminum alloy, and the like.

Additionally, as shown in FIG. 8C, a two-layer structure comprising an inner member 152 made of stainless steel and an outer member 150 made of the above vibration damping alloy may be adopted. Conversely, a two-layer structure comprising the inner member 152 made of the above vibration damping alloy and the outer member 150 made of stainless steel may be adopted. And, it is also possible that a bellows 118 is entirely made of the above vibration damping alloy.

Figure 9:
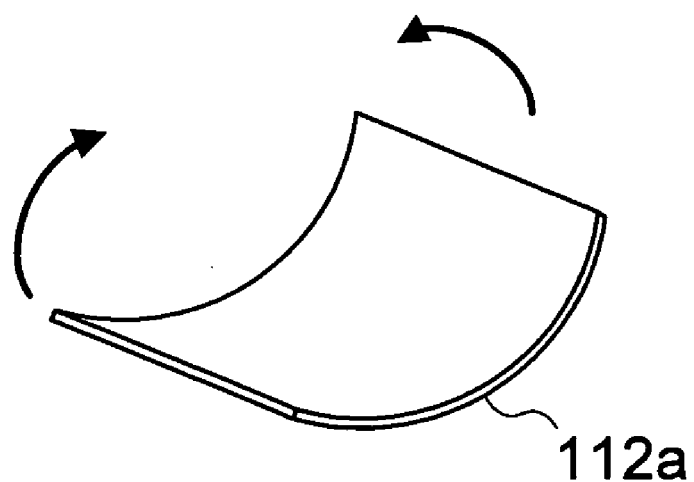
FIGS. 9A to 9D illustrate processes of forming the bellows shown in FIGS. 8A to 8C.
Figure 9:
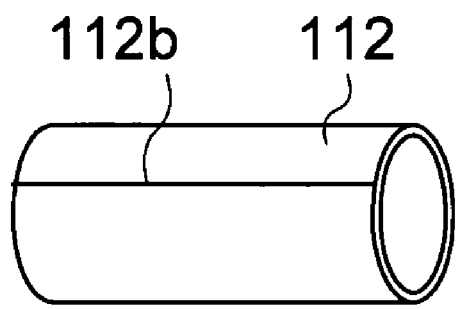
Figure 9:
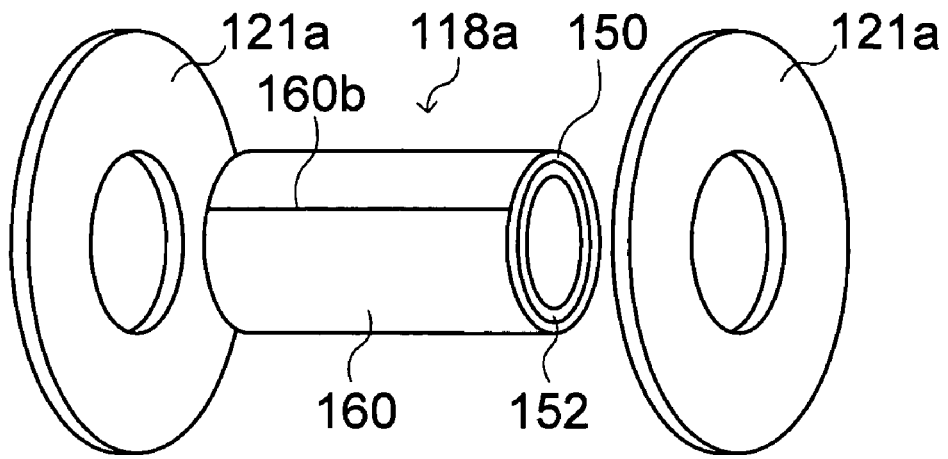
Figure 9:
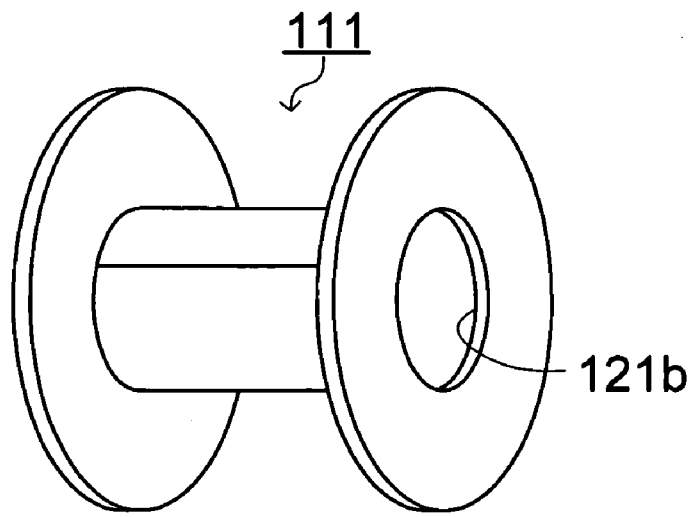
Figure 10:
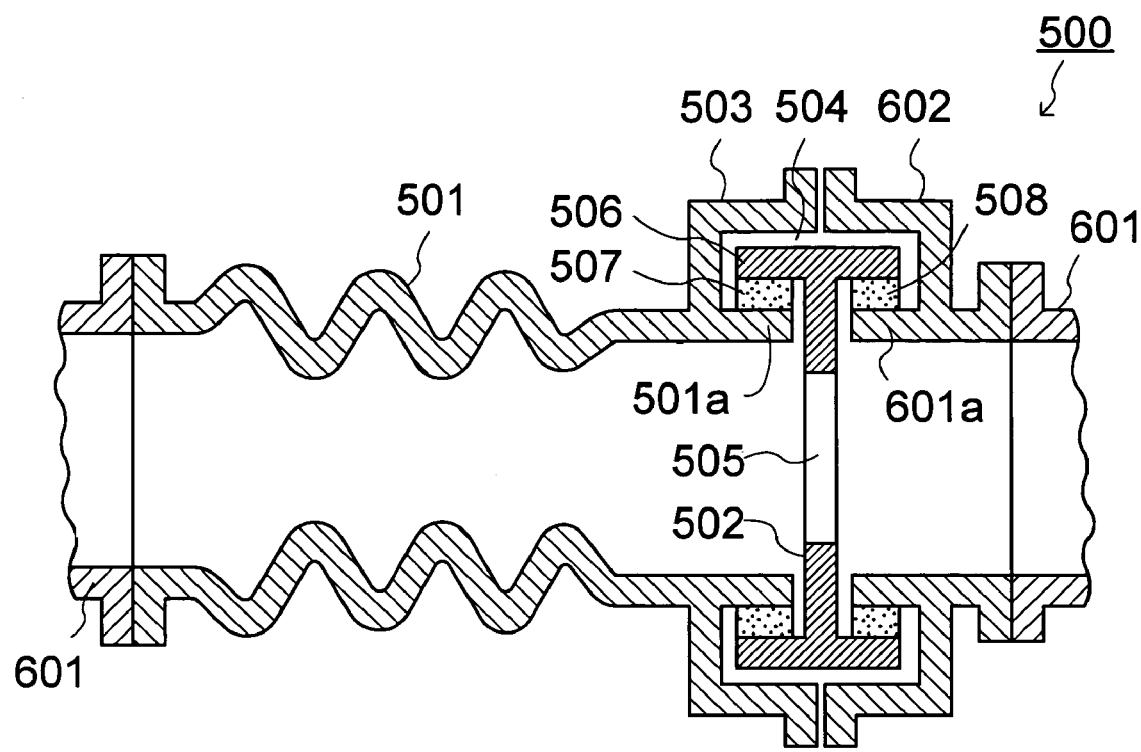
FIG. 10 is a schematic view showing an example conventional vibration damping coupling.

In order to form the bellows 118, a stainless steel plate and a vibration damping plate respectively having predetermined thickness are first pressure-bonded to form a laminated plate 112a (this laminated plate can be made by welding) such that the laminated plate 112a is rolled as shown in FIG. 9A and end edges thereof are welded to become a cylindrical member 160 as shown in FIG. 9B. Here, as to the welding of butt portion 160b, it is preferable to adopt the laser welding since it is a thin plate and HAZ should be suppressed. Besides, although radio-frequency welding, upset welding and the like may be used, continuous welding may be preferable to prevent leakage of fluid etc. flowing inside the pipe.

Next, as shown in FIG. 9C, this tubular member 118a is welded to discs 121a, 121a for flanges, which are depicted in both sides of the tubular member 118a and each of which has an opening part. First, end parts of the tubular member 118a are fitted to the opening parts of the discs 121a, 121a and, as shown in FIGS. 9C and 9D, welded at their inner peripheral parts 121b. In this manner, a flanged cylinder 111 (FIG. 9D) is formed as a preliminary assembly of the vibration damping coupling.

The flanged cylinder 111 prepared as mentioned above is formed into a bellows shape (or concertina shape) by a forming apparatus utilizing the hydraulic pressure. In this forming apparatus, a columnar inner press die to form the tubular part into a bellows shape with the pressure is inserted by pressing it approximately in a perpendicular direction to a base plate, and a movable plate capable of moving along an axial direction of the inner press die is disposed so as to oppose to the base plate. A plurality of outer press dies are provided between the base plate and the movable plate with an approximately equal interval. The plurality of outer press dies are disposed outside the cylinder 111 so that the cylinder is formed into a bellows shape by receiving portions of the tubular part bulged by the inner press die, thereby performing a bellows shape formation of the tubular part. The movable plate is provided with an opening part into which the inner die is inserted. Each of the separated outer press dies is moved in an axial direction at a predetermined ratio with a movement of the movable plate. Further, in order to remove the formed article, each of the outer press dies can be divided into semi-annulus ring parts. A movable structure may be adapted, for example, such that the movable plate and each outer press die are mechanically connected in a rack-and-pinion mechanism and each moving amount of each outer press die may be determined by adjusting a gear ratio of the rack-and-pinion mechanism, or the individual outer press die is moved under the actuator control. Further, a vicinity of each pressing end of the outer press dies is formed into a curved face to be fitted to a curved part of the bellows 18.

The cylinder 111 is slid such that the inner press die is inserted into a tubular hollow part of the flanged cylinder 111, and one of the flanges of the cylinder 111 is butted against the base plate. The flanged cylinder 111 is set to the forming apparatus such that the inner press die is inserted into each outer press die and the movable plate. Under this state, one end of the flanged cylinder 111 butts against a face of the base plate, the other end butts against a face of the movable plate, and the flanged cylinder 111 is restrained between the base plate and the movable plate. And, the hydraulic pressure is applied to the inner press die to bulge the tubular part and the movable plate is moved by applied pressure to the movable plate. Further, as the movable plate is moved, the outer press dies are also respectively moved in the axial direction by respective predetermined amounts. Further, as the outer press dies are moved, the outer press dies press an outer side face of the flanged cylinder 111.

As a result, since the flanged cylinder 111 is under a state of being inserted into the inner press die, it expands by being bulged in its axial and radial directions with the pressure application by means of the movable plate. And, the bulged portions of the flanged cylinder 111 are formed into a mountain-and-valley shape by being pressed against outside curved faces of the outer press dies. After the formation, the outer press dies are removed from the formed article by dividing itself, the movable plate is removed from the inner press die, and the formed bellows 118 is removed from the inner press die. In this manner, if the flanged cylinder 111 is formed by expansion as it is compressed in the axial direction, it is possible to form the bellows 118 without excessively changing thickness of the laminated plate 160.

When the vibration damping coupling 110 formed in a manner mentioned above is used in the building facilities such as hotel and apartment, devices causing the vibration such as a compressor and a pump are fixed to the pipe (not shown) so that the vibration may be transmitted through the pipe, but the vibration is absorbed and damped by the vibration damping alloy.

As explained above, with the vibration damping bellows according to the present invention, the vibration and the like can be effectively absorbed by the vibration damping bellows with a simple constitution. Further, according to the manufacturing method of the vibration damping bellows and the forming method of the vibration damping bellows of the present invention, it is possible to simply form the vibration damping bellows.

What is claimed is:

1. A vibration damping pipe which is expansible-and-contractible in an axial direction, comprising:
   an inner member having a bellows shape, the inner member comprising austenitic stainless steel;
   an outer member having a bellows shape disposed outside the inner member, the outer member comprising austenitic stainless steel; and
   a viscoelastic member disposed between the inner member and the outer member, the viscoelastic member comprising silicone rubber;
   wherein the inner member extends in the axial direction from a first inner member end to a second inner member end, and the first inner member end and the second inner member end are separated by a first distance in the axial direction;
   wherein the outer member extends in the axial direction from a first outer member end to a second outer member end, and the first outer member end and the second outer member end are separated by a second distance in the axial direction;
   wherein the first distance is greater than the second distance;
   wherein the viscoelastic member extends in the axial direction from a first viscoelastic member end substantially aligned with the first outer member end to a second viscoelastic member end substantially aligned with the second outer member end, and the first viscoelastic member end and the second viscoelastic member end are separated by a distance substantially equal to the second distance in the axial direction.

2. A vibration damping pipe which is expansible-and-contractible in an axial direction, comprising:
   an inner member having a bellows shape, the inner member comprising austenitic stainless steel, wherein the inner member extends in the axial direction from a first inner member end to a second inner member end, and the first inner member end and the second inner member end are separated by a first distance in the axial direction;
   an outer member having a bellows shape disposed outside the inner member, the outer member comprising austenitic stainless steel, wherein the outer member extends in the axial direction from a first outer member end to a second outer member end, and the first outer member end and the second outer member end are separated by a second distance in the axial direction;
   a viscoelastic member disposed between the inner member and the outer member, the viscoelastic member comprising silicone rubber;
   a first flange welded to the first inner member end but not to the first outer member end; and
   a second flange welded to the second inner member end but not to the second outer member end;
   wherein the first distance is greater than the second distance.

3. A vibration damping pipe which is expansible-and-contractible in an axial direction, comprising:
   an inner member having a bellows shape, the inner member comprising austenitic stainless steel;
   an outer member having a bellows shape disposed outside the inner member, the outer member comprising austenitic stainless steel; and
   a viscoelastic member disposed between the inner member and the outer member, the viscoelastic member comprising silicone rubber;
   wherein the viscoelastic member includes flaked pieces of silicone rubber, granular pieces of silicone rubber, or powered pieces of silicone rubber.

4. A vibration damping pipe which is expansible-and-contractible in an axial direction, comprising:
   an inner member having a bellows shape, the inner member comprising austenitic stainless steel;

an outer member having a bellows shape disposed outside the inner member, the outer member comprising austenitic stainless steel; and a viscoelastic member disposed between the inner member and the outer member, the viscoelastic member comprising silicone rubber;

wherein the viscoelastic member extends in the axial direction from a first viscoelastic member end to a second viscoelastic member end;

wherein a portion of the inner member and a portion of the outer member extend (i) beyond the first viscoelastic member end in a first axial direction from a point between the first viscoelastic member end and the second viscoelastic member end, and (ii) beyond the second viscoelastic member end in a second axial direction, different than the first axial direction, from the point;

wherein the portion of the inner member and the portion of the outer member extending beyond the first viscoelastic member end form a first ring;

wherein the portion of the inner member and the portion of the outer member extending beyond the second viscoelastic member end form a second ring.

5. The vibration damping pipe according to claim 4, wherein:

the first ring is configured so as to be attachable to a first flange; and the second ring is configured so as to be attachable to a second flange.

6. The vibration damping pipe according to claim 5, wherein:

the first ring includes holes for attaching the first ring to the first flange; and the second ring includes holes for attaching the second ring to the second flange.

7. A vibration damping coupling including a vibration damping pipe which is expansible-and-contractible in an axial direction, the pipe comprising:

an inner member having a bellows shape, the inner member comprising austenitic stainless steel;

an outer member having a bellows shape disposed outside the inner member, the outer member comprising austenitic stainless steel; and a viscoelastic member disposed between the inner member and the outer member, the viscoelastic member comprising silicone rubber;

wherein the inner member extends in the axial direction from a first inner member end to a second inner member end, and the first inner member end and the second inner member end are separated by a first distance in the axial direction;

wherein the outer member extends in the axial direction from a first outer member end to a second outer member end, and the first outer member end and the second outer member end are separated by a second distance in the axial direction;

wherein the first distance is greater than the second distance;

wherein the viscoelastic member extends in the axial direction from a first viscoelastic member end substantially aligned with the first outer member end to a second viscoelastic member end substantially aligned with the second outer member end, and the first viscoelastic member end and the second viscoelastic member end are separated by a distance substantially equal to the second distance in the axial direction.

8. A vibration damping coupling including a vibration damping pipe which is expansible-and-contractible in an axial direction, the pipe comprising:

an inner member having a bellows shape, the inner member comprising austenitic stainless steel, wherein the inner member extends in the axial direction from a first inner member end to a second inner member end, and the first inner member end and the second inner member end are separated by a first distance in the axial direction;

an outer member having a bellows shape disposed outside the inner member, the outer member comprising austenitic stainless steel, wherein the outer member extends in the axial direction from a first outer member end to a second outer member end, and the first outer member end and the second outer member end are separated by a second distance in the axial direction;

a viscoelastic member disposed between the inner member and the outer member, the viscoelastic member comprising silicone rubber;

a first flange welded to the first inner member end but not to the first outer member end; and a second flange welded to the second inner member end but not to the second outer member end;

wherein the first distance is cireater than the second distance.

* * * * *